United States Patent
Sivan et al.

(10) Patent No.: US 8,339,690 B2
(45) Date of Patent: Dec. 25, 2012

(54) HALFTONE PRINTING WITH DIFFERENT SCREENS

(75) Inventors: Yohanan Sivan, Raanana (IL); Shlomo Harush, Nes-Ziona (IL); Ran Waidman, Rehovot (IL); Eyal Shelef, Tel-Aviv (IL); Gregory Braverman, Hertzella (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 490 days.

(21) Appl. No.: 12/594,135

(22) PCT Filed: Apr. 30, 2007

(86) PCT No.: PCT/US2007/010428
§ 371 (c)(1),
(2), (4) Date: Sep. 30, 2009

(87) PCT Pub. No.: WO2008/133629
PCT Pub. Date: Nov. 6, 2008

(65) Prior Publication Data
US 2010/0067059 A1 Mar. 18, 2010

(51) Int. Cl.
*H04N 1/46* (2006.01)
(52) U.S. Cl. ......... 358/504; 358/1.9; 358/3.01; 358/3.1; 358/518; 358/520
(58) Field of Classification Search .................. 358/1.9, 358/3.01, 3.05, 3.06, 3.09, 3.21, 3.24
See application file for complete search history.

(56) References Cited

U.S. PATENT DOCUMENTS

| | | | |
|---|---|---|---|
| 6,603,566 B1 | 8/2003 | Shono | |
| 7,142,332 B2* | 11/2006 | Degani et al. | 358/3.1 |
| 7,411,700 B2* | 8/2008 | Johnson | 358/1.9 |
| 7,576,893 B2* | 8/2009 | Hains et al. | 358/3.23 |
| 7,595,906 B2* | 9/2009 | Nakajima et al. | 358/1.15 |
| 7,724,406 B2* | 5/2010 | Wang et al. | 358/504 |
| 2002/0083852 A1 | 7/2002 | Degani | |
| 2002/0113984 A1 | 8/2002 | Nakajima | |
| 2004/0095592 A1* | 5/2004 | Sanger | 358/1.9 |
| 2004/0150858 A1* | 8/2004 | Cholewo et al. | 358/3.06 |

FOREIGN PATENT DOCUMENTS

EP 0741491 A 11/1996

OTHER PUBLICATIONS

International search report and written opinion in parent PCT patent application PCT/US2007/010428, dated Jan. 23, 2008.

* cited by examiner

*Primary Examiner* — Dung Tran

(57) ABSTRACT

A method of enabling preparing a printing system calibrated with a first halftone screen for printing with a second halftone screen. The calibration is represented by calibration data. Calibration data for the second halftone screen is produced from the existing calibration data of the first halftone screen without resorting to previous calibration data for the second halftone screen, based on correlation data which represent a first-order correlation between the halftone screens.

18 Claims, 12 Drawing Sheets

*Fig. 6*

CORRELATION DATA

| | | |
|---|---|---|
| HS1_HS2 | C | GRAY LEVEL |
| HS1_HS2 | M | GRAY LEVEL |
| HS1_HS2 | Y | GRAY LEVEL |
| HS1_HS2 | K | GRAY LEVEL |
| HS1_HS3 | C | GRAY LEVEL |
| HS1_HS3 | M | GRAY LEVEL |
| HS1_HS3 | Y | GRAY LEVEL |
| HS1_HS3 | K | GRAY LEVEL |
| HS2_HS3 | C | GRAY LEVEL |
| HS2_HS3 | M | GRAY LEVEL |
| HS2_HS3 | Y | GRAY LEVEL |
| HS2_HS3 | K | GRAY LEVEL |

HALFTONE PRINTING WITH DIFFERENT SCREENS

FIELD OF THE INVENTION

The present invention relates generally to halftone printing with different screens, and for example, to a method of preparing a printing system calibrated with a first halftone screen for printing with a second halftone screen, a method of generating correlation data for at least two halftone screens, a method of enabling a printing system to print with at least two different halftone screens, a printing system arranged to print with at least a first and a second halftone screen, as well as to correlation data for at least two halftone screens.

BACKGROUND OF THE INVENTION

Digital halftone printing refers to the process of converting a continuous tone image to binary dots for its reproduction by a printing device. The continuous tone image is usually converted by a raster image processor. In some halftoning techniques each pixel of the original image is converted from the continuous tone into a binary dot according to a threshold array of a halftone screen.

The term halftone screen refers to a pattern of printed dots of varying size and shape which is applied to the digital input of an image for printing. Different halftone screens differ by the number of printer pixels which are grouped to form the dots. The size of the dots also varies according to tone. The halftone screens differ by the shape of the patterns and the shape of the dots. The shape of the dots vary and are elliptical, round or square. Also the dot growth is different for the halftone screens. For some halftone screens the size of dots is increased from the dot center. For other halftone screens the dot size is increased in intervals. (see, for example, D. L. Lau and G. R. Arce, "Modern Digital Halftoning", Marcel Dekker, Inc., 2001, pages 1 to 26).

Prior to printing, a printing device is usually calibrated and a tone-reproduction curve is determined, which defines the relationship between the digital input and the output actually reproduced by the printing device. Generally, individual calibrations are required for each halftone screen.

U.S. Pat. No. 6,484,631 B2 describes a method and system that updates individualized calibrated tone reproduction curves for a printing device. A plurality of predetermined stored calibrated tone-reproduction curves are used, each predetermined stored calibrated tone-reproduction curve corresponding to a distinct combination of substrate and halftone screen. The predetermined stored tone-reproduction curves are related to a reference substrate and reference halftone screen combination. For calibration of the printing device, the reference substrate and reference halftone screen combination is used and a new associated tone-reproduction curve is determined. The predetermined stored tone-reproduction curves are updated by using the new tone-reproduction curve and the relations between the predetermined stored tone-reproduction curves and the reference substrate and reference halftone screen combination.

SUMMARY OF THE INVENTION

A first aspect of the invention is directed to a method of preparing a printing system calibrated with a first halftone screen for printing with a second halftone screen, the calibration being represented by calibration data. The method comprises producing calibration data for the second halftone screen from the existing calibration data for the first halftone screen without resorting to previous calibration data for the second halftone screen, based on correlation data which represent a first-order correlation between the halftone screens.

According to another aspect, a method is provided of generating correlation data for at least two different halftone screens. The method comprises producing printed output from a digital input for different print conditions and the halftone screens; relating the printed output for the different print conditions obtained with the first halftone screen to that obtained with the second halftone screen; and generating correlation data representing a first-order correlation between the halftone screens.

According to another aspect, a method is provided of enabling a printing system to print with at least two different halftone screens without performing recalibration for more than one of the halftone screens. The method comprises equipping the printing system with correlation data representing a first-order correlation between the halftone screens to enable calibration data for the second halftone screen to be produced from the first halftone screen without resorting to previous calibration data for the second halftone screen.

According to another aspect, a printing system is arranged to print with at least a first and a second halftone screen, and equipped with correlation data representing a first order correlation between the halftone screens. The printing system being arranged to produce calibration data for the second halftone screen from existing calibration data for the first halftone screen without resorting to previous calibration data for the second halftone screen, based on the correlation data; and to print with the second halftone screen according to the produced calibration data.

According to another aspect, correlation data for at least two halftone screens are stored on a storage medium, wherein the correlation data represent a first-order correlation between the halftone screens to enable calibration data for the second halftone screen to be produced from the first halftone screen without resorting to previous calibration data for the second halftone screen.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 6 shows the correlation data in detail, according to an embodiment;

The drawings and the description of the drawings are of embodiments of the invention and not of the invention itself.

DESCRIPTION OF THE PREFERRED EMBODIMENTS

Figure 1:
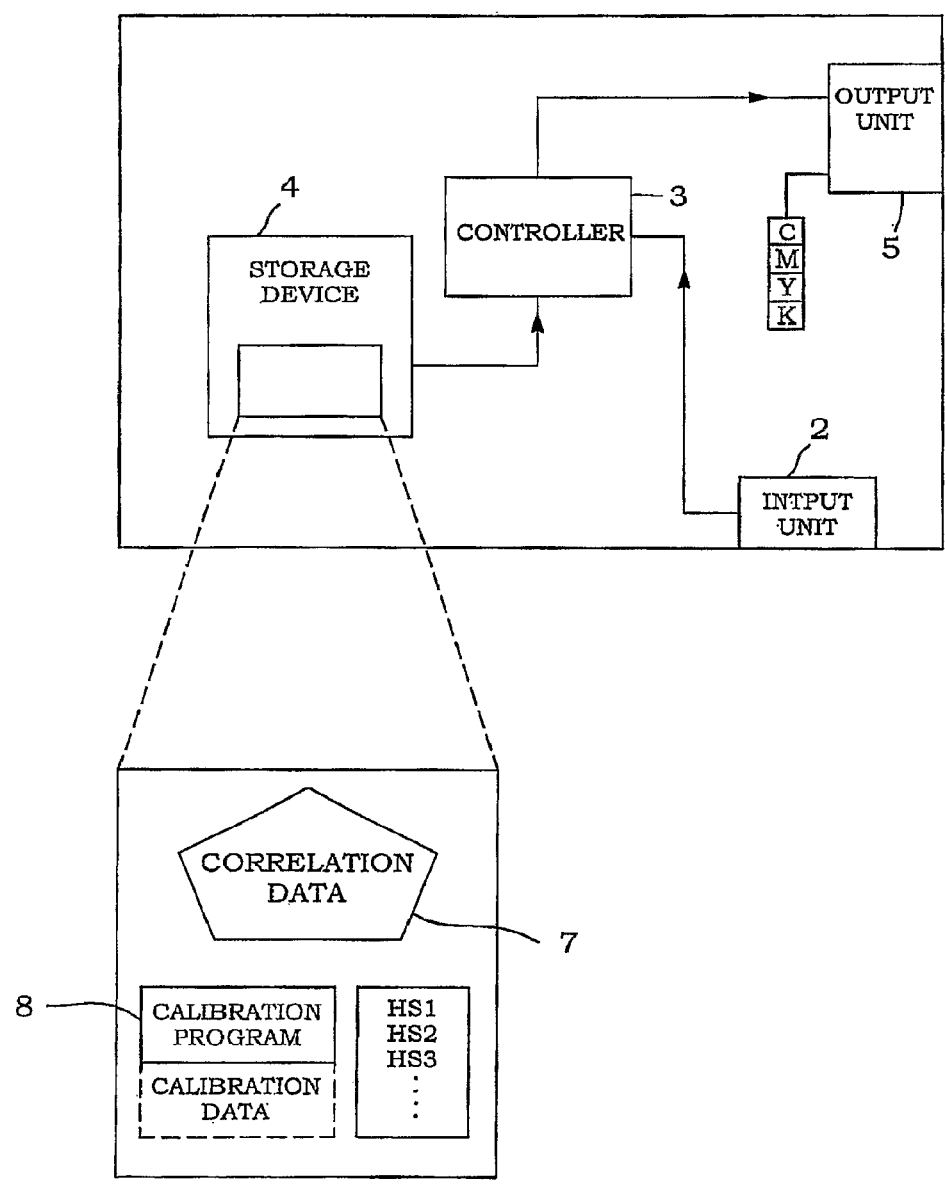
FIG. 1 shows an embodiment of a printing system.

FIG. 1 shows a printing system. The printing system is arranged to print with different halftone screens. Before proceeding further with the detailed description of FIG. 1, however, a few items of the embodiments will be discussed.

As mentioned at the outset, different halftone screens are best for printing different image properties. Different halftone screens reproduce an image differently depending on the halftone screen. Therefore different calibration data are applied to the printing system for each halftone screen respectively. A calibration of the printing system for each halftone screen, as in the references, consumes unnecessarily large quantities of paper and time.

In the embodiments, the calibration data for the halftone screens are produced singly from generated calibration data for one of the halftone screens and correlation data, which represent a first-order correlation between the halftone screens. There is no need to resort to previous calibration data for the halftone screens, nor is it necessary to store old calibration data for the halftone screens. A single calibration operation is sufficient for the production of the calibration data for any of the halftone screens used for printing.

In the embodiments a first and second halftone screen are exemplarily chosen from a variety of halftone screens. Naturally all description means also apply to any halftone screen or combination of halftone screens mentioned.

In U.S. Pat. No. 6,484,631 B2 an update of old calibration data for the halftone screens is performed. From the change of the calibration data for a reference halftone screen and from the relations between the stored old calibration data for the halftone screens and the old calibration data of the reference halftone screen, the old calibration data for the halftone screens are updated. In other words, the said relations are second-order correlations because they allow only the mapping of the change of the calibration data for the reference halftone screen onto the change of the calibration data for another halftone screen. Therefore predetermined old calibration data for the halftone screens are stored and updated according to the second-order correlation.

In contrast, the first-order correlation enables the production of the calibration data for any of the halftone screens and there is no need to store previous old calibration data. The first-order correlation allows the mapping of a calibration for the first halftone screens onto the calibration for a second halftone screen. Thus this correlation is a first-order correlation.

Prior to printing, a digital format of an image is provided with the image by a designer. In color printing the digital format is provided for ink colors of the printing system. In some embodiments a hardcopy of the image is also provided, showing a final outcome of the printed image. The output print of the printing system should match the hardcopy. For this, dedicated halftone screens are selected and the printing system is prepared for printing test printouts with a first and a second halftone screen.

Prior to printing the test printouts, a calibration of the printing system is performed with the first halftone screen. An area represented by a digital input and the printed output is measured. The calibration data are generated such that the digital input is reproduced as the printed output by the printing system calibrated with the first halftone screen. A more detailed description of the calibration measurement can be found in the description of FIG. 3. The resulting calibration data are applied to the printing system. A first test printout is reproduced with the first halftone screen.

Figure 2:
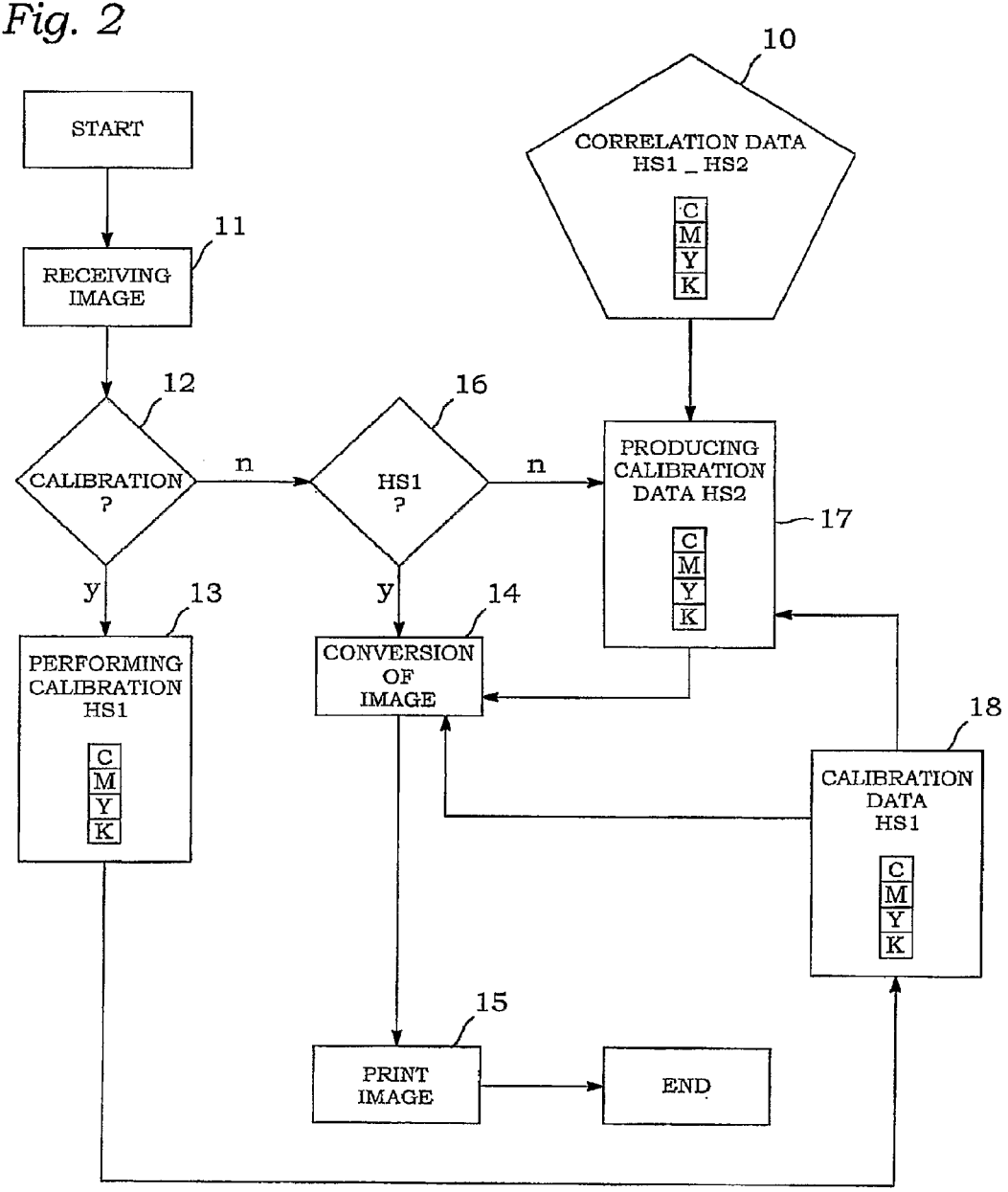
FIG. 2 is a flow chart showing the preparation of the printing system for printing with different halftone screens, according to an embodiment.

Before a second test printout is printed, calibration data for the second halftone screen are produced from the calibration data for the first halftone screen and the correlation data which represent the first-order correlation between the first and second halftone screen. The second test printout is printed shortly after the first printout. The best test printout is selected and the image is reproduced with the halftone screen associated with the best test printout. In FIG. 2 a flow chart is shown of the preparation of the printing system for printing with two different halftone screens. In other embodiments several test printouts are printed, each with different halftone screens and the calibration data are produced from the calibration data for the first halftone screen and the correlation data which represent the first-order correlation between the halftone screens.

The digital input of the area is also referred to as input reflectance, digital dot area or also as digital gray level. The printed output of the area is often referred to as output reflectance, printed dot area or printed gray level. These notations are used simultaneously.

The digital gray level of the area is defined by the ratio of pixels with color to the total number of pixels, which means the digital gray level is defined by the ratio of an area with "on" pixels to a total area. The area with "on" pixels is also referred to as digital dot area, as the pixels are converted into binary dots for printing. The printed gray level is defined by the ratio of an area containing ink to the total area. The area containing ink is also referred to as printed dot area.

In some of the embodiments the correlation data are generated by printing printed outputs which are represented by different digital inputs. The printed outputs are reproduced with different halftone screens for ink colors of the respective printing system and for different print conditions. The different print conditions include types of substrates, different instances of the same printing system type, and a time-drift of the instances of the same printing system type (an "instance" is an individual thing that, because of its features, belongs to a type). These printed outputs are related for the first and the second halftone screen according to the different print conditions.

Figure 10:
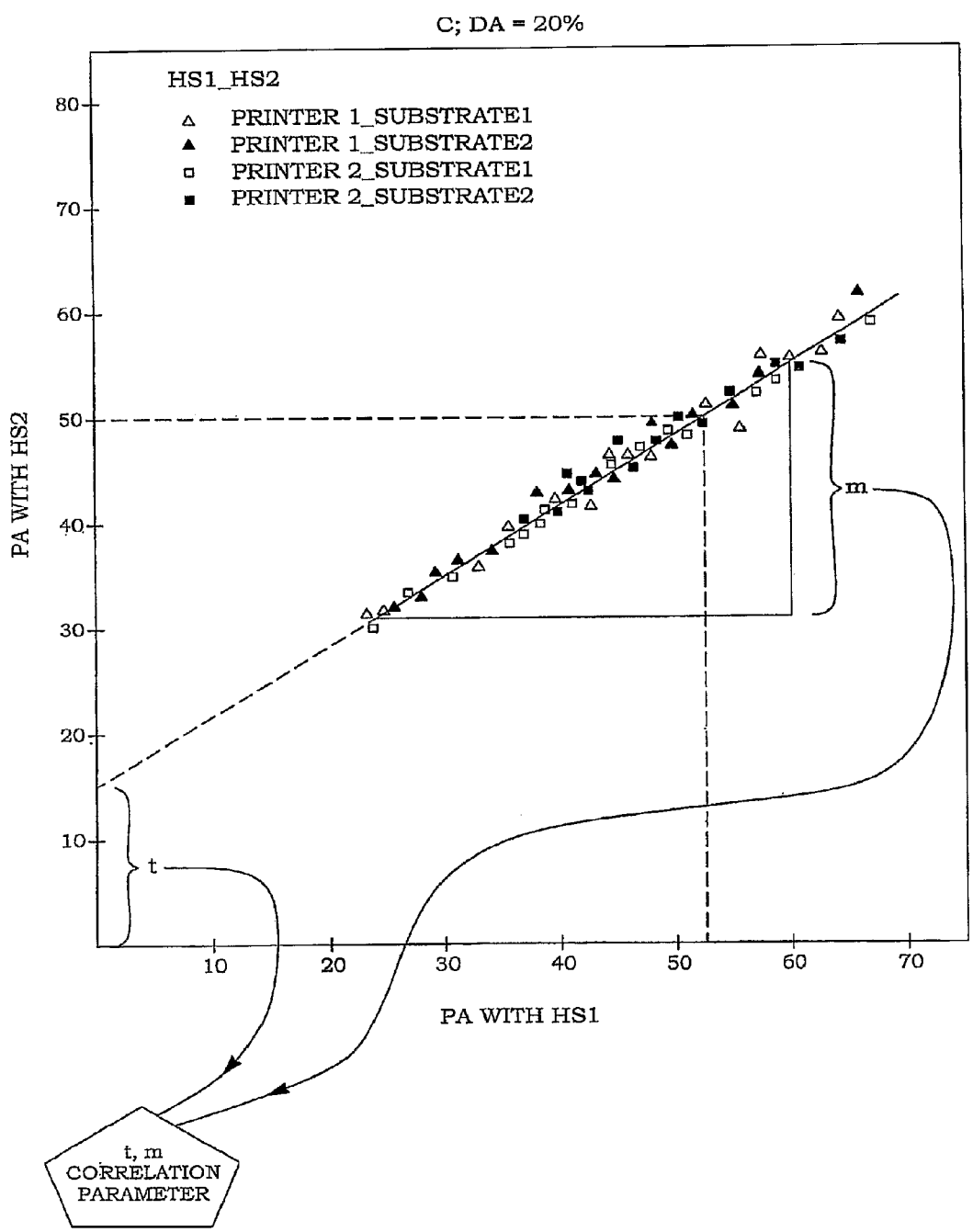
FIG. 10 is a graphical representation of the correlation data for two halftone screens for a distinct gray level and ink color cyan, according to an embodiment.

The correlation data are parameterized in different forms. In a first form the same digital dot area is multiply printed for each ink color and combination of halftone screens for different print conditions, and the printed dot areas are related according to the digital dot area. A parameterization as shown in FIG. 10 is produced as a first-order correlation between the halftone screens. The correlation between the halftone screens is expressed with a simple relation of a straight line, whereby the line is characterized by a linear equation with the parameters of a gradient and an axis intercept. The gradient represents the relative change of the printed areas between the halftone screens and the axis intercept represents the actual difference between the halftone screens.

The correlation data are generated for various distinct digital dot areas separately for each ink color, for each combination of halftone screens and for different print conditions. An interpolation for intermediate digital dot areas is performed by using the parameters described above. In a second form of parameterization, the first-order correlations are expressed separately for each ink color by a relative difference between the printed dot areas for the halftone screens as a function of continuous values of the digital dot area and by an offset which is the actual difference between the halftone screens as a function of continuous values of the digital dot area. Both forms of parameterization represent the first-order correlation between the halftone screens.

The printing system is an assembly of a printing device, a conversion of the image, the calibration data, the halftone screens and an effect of the calibration data on the converted image. In some of the embodiments the printing device is arranged to produce the effect of the calibration data on the converted image. In other embodiments a computing device and the printing device are arranged as the printing system.

In some of the embodiments the calibration data are generated such that a digital input is reproduced by a printed output when printed by the printing system using the halftone screen. In some of the embodiments, the calibration operation generates calibration data, which linearize a dot gain. The dot gain is an increase in size of a printed dot relative to its intended size. In the printing process, printed dots often overlap with neighboring pixels, so that the printed dot size is different from the intended dot size. The dot gain can cause a shift in color, so that a printed output appears darker than the original. The calibration data are applied to the printing device and compensates for the dot gain, i.e. linearizes the dot gain (see, e.g., D. L. Lau et al., pages 153 to 159).

In color printing a halftone screen pattern for each ink color cyan, magenta, yellow and black is printed in succession. The calibration operation of U.S. Pat. No. 6,484,631 B2 proposes a calibration of the printing device performed in the La*b* color system. The printing device is calibrated, so that an input of a gray sweep from perfect black to perfect white is reproduced by the printer. During the calibration process an equal amount of cyan, magenta and yellow is sent to the printer and the resulting colors are measured to get a certain La*b* response out. A calibration tone reproduction curve is derived that compensates for the raw response of the printing device.

In contrast, in some of the embodiments the calibration data are generated separately for the ink colors cyan, magenta and yellow, as well as for the ink color black of the printing device. The printed output is measured separately for the ink colors. The calibration data are generated such that the digital input is reproduced by the printed output for each ink color.

In order to generate the correlation data for two halftone screens, different digital inputs are printed with a first halftone screen separately for the ink colors. The different digital inputs are also printed with a second halftone screen separately for the ink colors. The printed output is measured. Multiple printing operations and measurements are performed. The measured printed outputs for the first and second halftone screen are related to each other according to different print conditions, in order to generate the correlation data according to the digital input separately for the ink colors. The correlation data represent the first-order correlation between the first and second halftone screen.

The correlation data are generated for different print conditions. The different print conditions include the substrate type for the printed output and instances of a same printing system type, as well as the time-drift of these printing systems. The time-drift characterizes the inherent variations over time of the printing system. A change of the print conditions affects the halftone screens in a correlated manner for the same gray level. In some of the embodiments the correlation data are determined for two halftone screens for a variety of gray levels.

Surprisingly, the correlation data are independent of an individual printing system, as in U.S. Pat. No. 6,484,631 B the replacement of one halftone screen with another halftone screen includes the calibration data which are individualized for the printing system.

The quality of a printed image also depends on the type of substrate the image is printed on. In U.S. Pat. No. 6,484,631 B2 it has not been recognized that a correlation for different halftone screens can be determined which is independent of the substrate type used for the printed image. In U.S. Pat. No. 6,484,631 B2 a new calibration operation is performed, if the substrate type is changed.

In contrast, in the embodiments the correlation data encompass different types of substrates. The effect of the substrate type on the calibration data for one of the halftone screens is correlated with the effect of the substrate type on the calibration data for the other halftone screens. This correlation is represented by the first-order correlation.

In some of the embodiments the correlation data represent first-order correlations between any combination of the halftone screens. Let 'n' be the number of halftone screens. The number of combinations for the halftone screens is then $n \times (n-1)$. The correlation data are generated for each of these combinations separately for each ink color for different gray levels and print conditions.

In some of the embodiments a fine adjustment for the correlation data are performed by additional measurements on a specific printing system. The reproduced printed output of the digital input is measured for at least two halftone screens of the printing system. These measured printed outputs are used additionally to the correlation data represented by the first-order correlation for an improved accuracy op the specific printing system.

Returning now to FIG. 1, which shows a printing system. The printing system is shown as a block diagram and is a printing device 1 with an input unit 2, controller 3, a storage device 4, and an output unit 5. The printing device 1 is provided with ink colors C, M, Y, K. In the storage device 4 there are also stored correlation data 7, a calibration program 8 and halftone screens HS1, HS2, HS3.

The printing device 1 is a liquid-toner electrographic printer, for instance a HP Indigo Press 5000. An image is received by the input unit 2 as digital input and transferred to the controller 3. The controller 3 converts the intermediate color tones of the image to dots according to a halftone screen HS1, HS2, HS3 stored in the storage device 4 of the printing device 1. The controller 3 transfers the converted image to the output device 5. The ink colors C, M, Y, K are used by the output device 5 for printing the image.

Prior to printing the image, the controller 3 checks whether a calibration should be performed. The calibration is performed with a first halftone screen HS1, HS2, HS3 stored in the storage device 4. The generated calibration data are stored in the storage device 4. If new calibration data are generated with the said halftone screen, the old calibration data are overwritten. The calibration measurements are performed at the beginning of a printing operation and repeated every 5000 impressions. Therefore a calibration measurement is repeated nearly every hour for the HP Indigo Press 5000, if in permanent use.

If one of the other halftone screens HS1, HS2, HS3 is used for printing, the calibration data are produced from the calibration data of the first halftone screen and from the correlation data 7 stored in the storage device. The production of the calibration data for the second halftone screen is performed by the controller.

In other embodiments the halftone screens HS1, HS2, HS3, the generated or produced calibration data and the correlation data 7 are stored remotely from the printing device 1 on a computing device and transferred to the printing device 1 when required.

FIG. 2 is a flow chart showing the preparation of the printing system for printing with different halftone screens HS1, HS2. Two halftone screens HS1, HS2 and correlation data for the halftone screens at block 10 for the ink colors C, M, Y, K are stored in the storage device 4 of the printing device 1.

Starting with the receipt of an image at block 11, it is verified at block 12 whether a calibration should be performed. The calibration is performed at block 13 by using a first halftone screen HS1 and is performed for each ink color C, M, Y, K.

Calibration data at block 18 for the first halftone screen HS1 are provided for each ink color as a Dot-Gain-Linearization-Table. The calibration is performed by measuring a printed dot area as a function of a digital dot area. The printed dot area is affected by the dot gain. The calibration data at block 18 for the first halftone screen HS1 compensate for the dot gain, when applied to the printing device 1.

The dot gain can be caused by a size and a shape of a laser beam of the printing device as well as by an interaction of laser light and material over a photo imaging plate (PIP), by the pressure between the PIP and a blanket and by temperatures of an impression, the PIP and the blanket. The dot gain can also be caused by the density and conductivity of the ink. The type of substrate may also affect the dot gain, e.g. absorbent papers minimize the amount of dot gain as ink is allowed to diffuse down into the paper and dense papers do not absorb the ink but instead allow ink to spread across the surface, creating a larger dot than intended.

For one calibration seventeen different patches of various gray levels are printed with the first halftone screen HS1 for each color C, M, Y, K. In other embodiments a different number of patches or other printed patterns may be used for measuring the printed dot area and therefore generating the dot gain and the calibration data.

The calibration data at block 18 for the halftone screen HS1 are stored in the storage device 4. After calibration, the image is converted according to the first halftone screen HS1 at block 14, taking into account the calibration data of the first halftone screen HS1 at block 18. The conversion is performed for example by a raster image processor. The image is printed at block 15.

If no calibration must be performed at block 12, a check is made at block 16 whether the first halftone screen HS1 is to be used for printing. If the first halftone screen HS1 is used for printing, the image is converted at block 14 according to the halftone screen HS1 and the calibration data of the halftone screen HS1 at block 18. The image is printed at block 15.

If a second halftone screen HS2 is used at block 16 for printing the image, calibration data of the second halftone screen HS2 are produced at block 17 for each ink color C, M, Y, K. The calibration data for the second halftone screen HS2 are produced from the correlation data at block 10 and from the calibration data of the first halftone screen HS1 at block 18 for which the calibration was performed at block 13. The correlation data represent a first-order correlation between the two halftone screens HS1, HS2 separately for each ink color C, M, Y, K. The image is converted at block 14 according to the second halftone screen and its calibration data at block 17. The image is printed at block 15.

In other embodiments various halftone screens and correlation data which represent a first-order correlation between any combination of halftone screens are stored in the storage device 4. The calibration data of the various halftone screens are produced from the correlation data and calibration data from a single calibration measurement.

Figure 3:
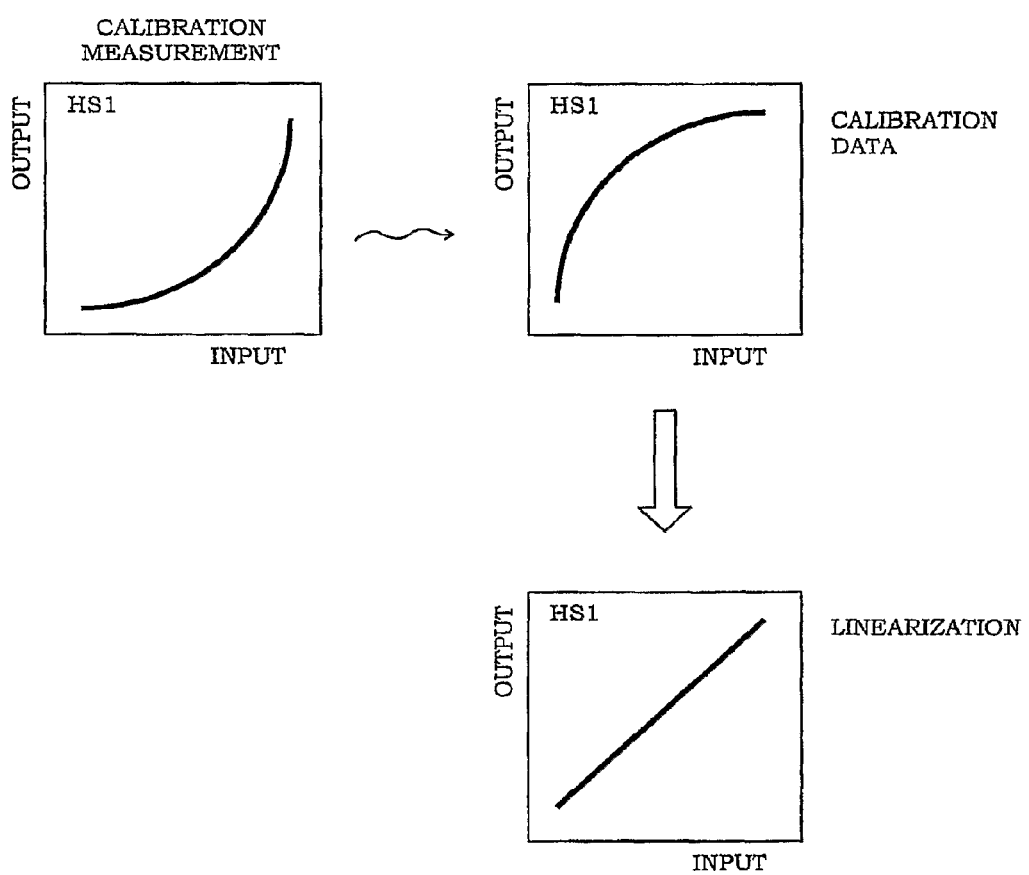
FIG. 3 illustrates the generation of calibration data for a halftone screen, according to an embodiment.

FIG. 3 illustrates the generation of calibration data for a halftone screen. An input which is a digital dot area is reproduced by the printing system with the first halftone screen HS1 as output, which is a printed dot area. For a calibrated printing system or for a linearized printing system the input should be reproduced by the output of the printing system. The calibration measurement shows a discrepancy between the input and the output.

The calibration data are generated from the calibration measurement and compensate for the discrepancy. The calibration data are applied to the printing system and linearize the printing system so that the input is reproduced by the output of the printing system. A digital dot area with a distinct gray level is reproduced as a printed dot area with the same distinct gray level.

Figure 4:
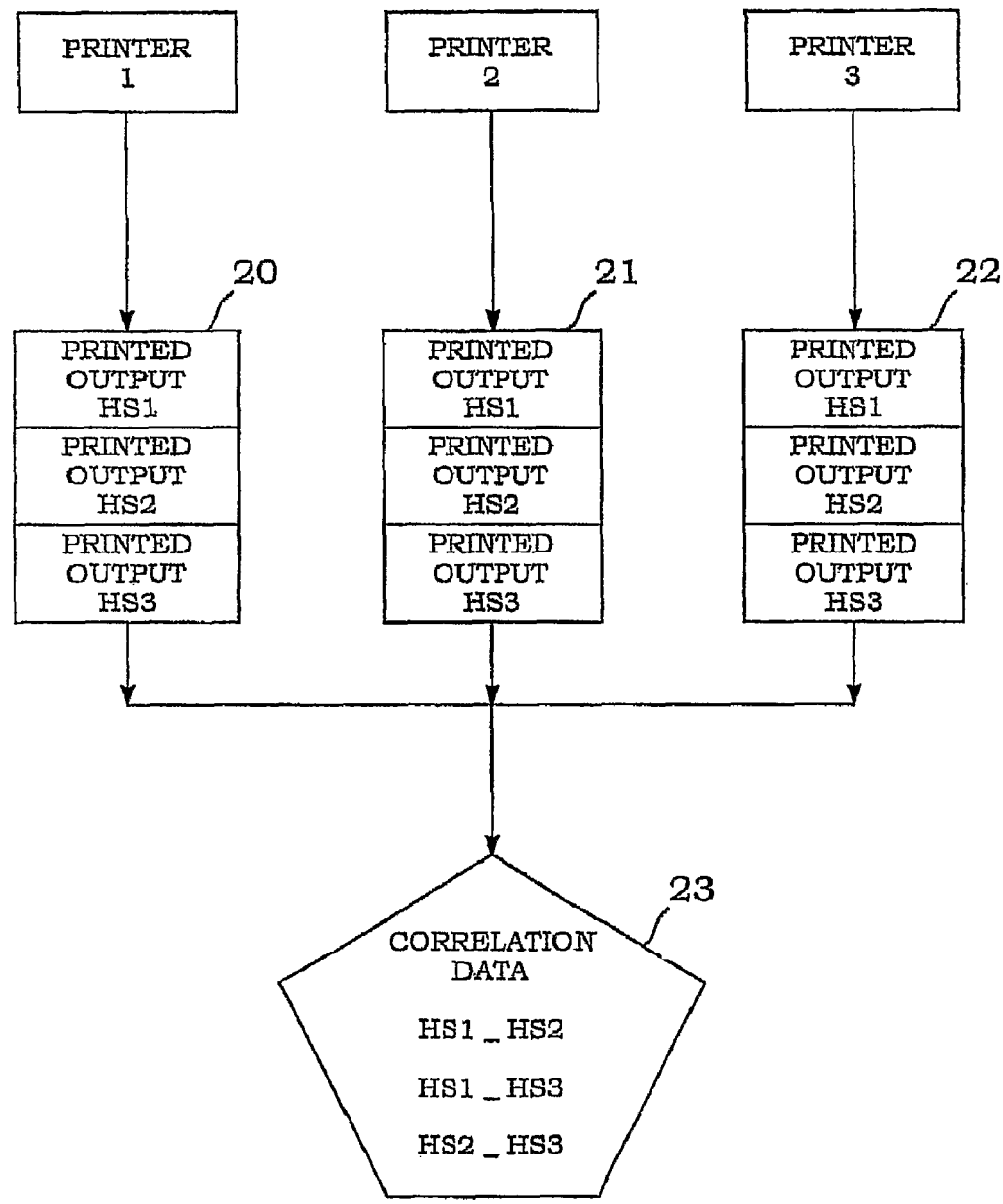
FIG. 4 is a flow chart showing the generation of correlation data for the different halftone screens, according to an embodiment.

FIG. 4 is a flow chart showing the generation of correlation data for halftone screens HS1, HS2, HS3. The three halftone screens HS1, HS2, HS3 are each provided to three instances of a same printing system type. That means the printing systems printer1, printer2, printer3 are of the same type and model.

Same digital dot areas are multiply printed by the printing systems printer1, printer2, printer3. Multiple measurements of the printed dot area are performed for the printing devices printer1, printer2, printer3 at block 20, 21, 22 respectively. Each of the measurements are performed separately for the ink colors C, M, Y, K of the printing devices printer1, printer2, printer3. The measurements are performed for different substrate types and different print conditions of the printing devices printer1, printer2, printer3. A detailed description of the different print conditions for a printed dot area of instances of the same printing system type is given in FIG. 5.

The correlation data are determined at block 23 from the printed dot area data of block 20, 21, and 22 and the digital dot area. The correlation data at block 23 are determined for any combination of halftone screens HS1, HS2, HS3. A detailed description of the correlation data are given in FIG. 6.

In other embodiments the measurements of the printed dot area are performed on numerous printing systems for a various number of halftone screens provided to the printing systems.

Figure 5:
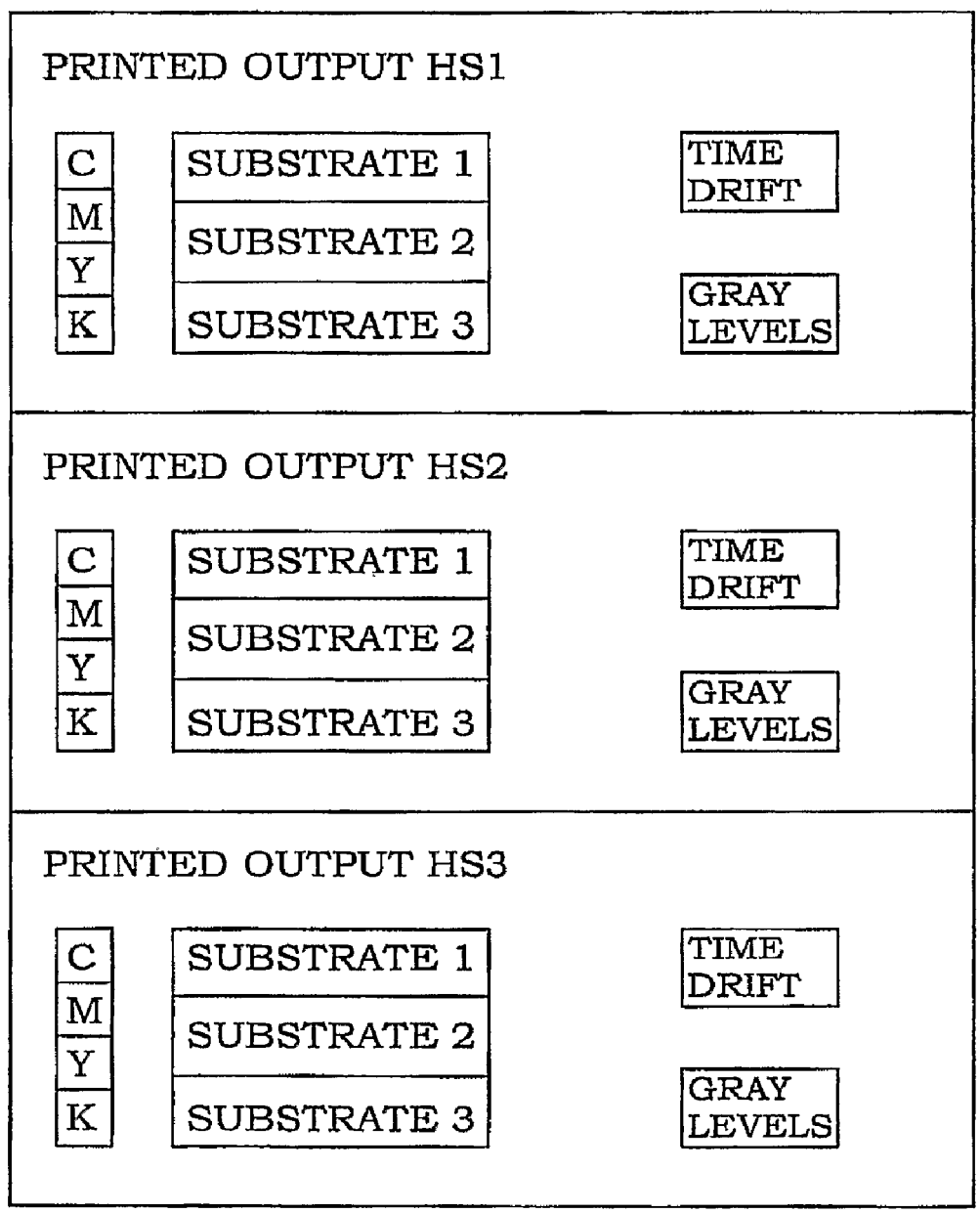
FIG. 5 shows different print conditions for a printed output of instances of a same printing system type.

FIG. 5 shows the different print conditions for the printed dot area of instances of the same printing system type. As described in FIG. 4 multiple measurements of the printed dot area are performed for the three halftone screens HS1, HS2, HS3. By way of example the different print conditions are outlined for one of the printing systems printer1, printer2 and printer3.

For each halftone screen HS1, HS2, HS3, separate measurements of the printed dot area are performed for each ink color C, M, Y, K. For each measurement different patches, e.g. seventeen, are printed on three different types of substrates substrate 1, substrate 2, substrate 3. Different printed dot areas are measured for each ink color C, M, Y, K separately for each substrate type. The substrate type is paper, glossy paper and transparencies. In other embodiments also laser paper, news print and matt-surface paper are used for printing. The printed dot areas are also measured for various gray levels of the digital dot area.

The print conditions of the printing system change over time; this is called time-drift. When the said measurements are performed, the time-drift is also accounted for by performing the measurements over a long period of time. Therefore a change of the size and shape of the laser beam, the change of the pressure between blanket and PIP, etc., which cause dot gain, are included in the measurements and therefore in the correlation data.

FIG. 6 shows the correlation data in detail. In the embodiment of FIG. 4 the correlation data at block 23 establish a correlation between the three halftone screens of the printing devices printer1, printer2, printer3.

The combinations of the three halftone screens HS1_HS2, HS2_HS3, HS2_HS3. are shown in FIG. 6. For each halftone screen combination, separate correlation data are generated for the ink colors C, M, Y, K and for multiple gray levels.

The correlation data are independent of the individual printing system to which they are provided. The measurements from which the correlation data are generated include three printing devices printer1, printer2 and printer3. The resulting correlation data encompass different kinds of substrates and the time-drift of the printing devices printer1, printer2 and printer3. It has been recognized that the correlation data represent a first-order correlation between the halftone screens. The first-order correlations are independent of the printing systems and time-drift thereof, as well as of the types of substrates. The correlation data are generated for different ink colors C, M, Y, K and for various gray levels.

From these correlation data and generated calibration data for a single halftone screen the calibration data for any other halftone screen are produced for the different ink colors C, M, Y, K and for various gray levels.

Figure 7:
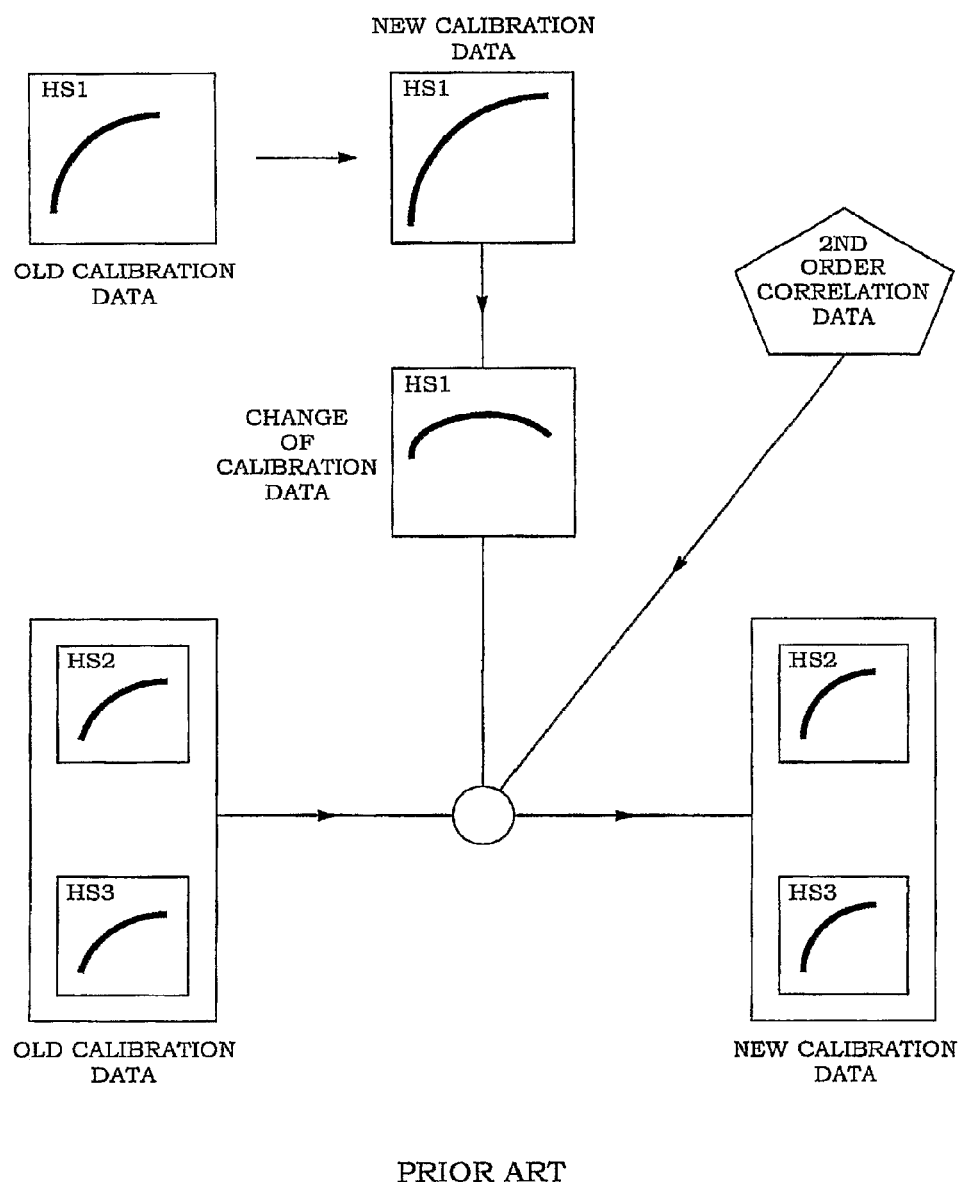
FIG. 7 illustrates an update of previous calibration data, according to the prior art.

FIG. 7 illustrates an update of previous calibration data as in the prior art. Old calibration data for the first, second and third halftone screens HS1, HS2, HS3 are stored in a storage device according to the prior art.

A new calibration measurement is performed with the first halftone screen HS1. The first halftone screen HS1 is also a reference halftone screen. The newly generated calibration data for the first halftone screen HS1 are compared with the old calibration data for the first halftone screen and a change of the calibration data is determined.

After the new calibration measurement has been performed, the second and third halftone screens HS2, HS3 are updated by using the second-order correlation data which represent the relative change of the old calibration data for the second and third halftone screen HS2, HS3 to the old calibration data for the first halftone screen HS1. The old calibration data for the second and third halftone screen HS2, HS3 are updated by using the second-order correlation data and new calibration data for the second and third halftone screens HS2, HS3 are determined. The new calibration data for the first, second and third halftone screens HS1, HS2, HS3 are stored along with the old calibration data of the respective halftone screens HS1, HS2, HS3.

Figure 8:
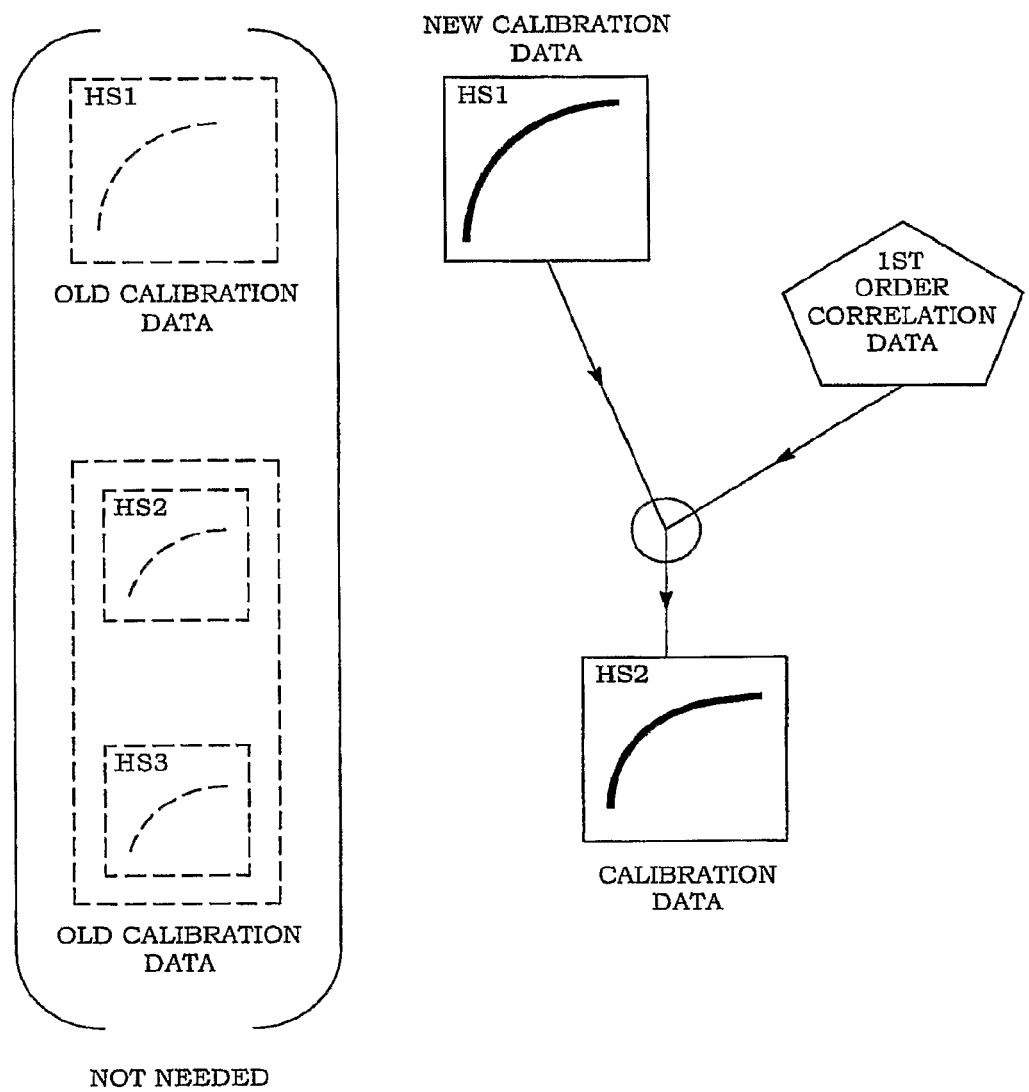
FIG. 8 illustrates the production of calibration data for a second halftone screen from the calibration data of a first halftone screen and the correlation data, according to an embodiment.

FIG. 8 illustrates a production of calibration data for a second halftone screen from the calibration data of a first halftone screen and the correlation data.

The old calibration data for the first, second and third halftone screens HS1, HS2, HS3 are not needed.

A new calibration measurement is performed with the first halftone screen HS1. It is also possible to perform the new calibration measurement with the second or third halftone screen HS2, HS3.

After the new calibration measurement has been performed, the calibration data for the second halftone screen HS2 are produced from the new calibration data for the first halftone screen HS1 and from the correlation data represented by the first-order correlation. The calibration data produced for the second halftone screen HS2 are temporarily stored in a storage device or storage medium. If a new calibration of the printing system is necessary, that calibration measurement is performed with the second halftone screen HS2. If the second halftone screen HS2 is replaced by the third halftone screen HS3, the calibration data for the third halftone screen HS3 are produced from the calibration data of second halftone screen HS2.

In other embodiments the new calibration data which are generated or produced for the halftone screens HS1, HS2, HS3 are stored in the storage device.

Figure 9:
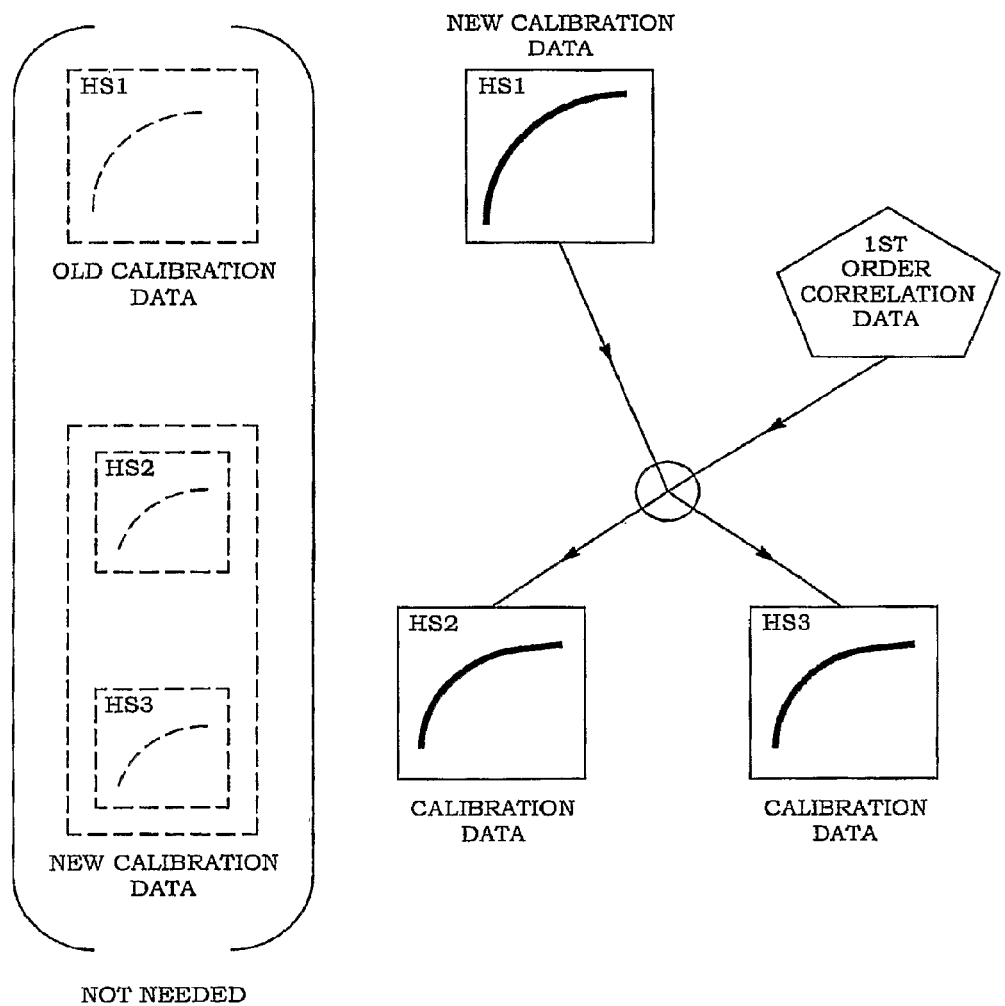
FIG. 9 illustrates the production of calibration data for two halftone screens from the calibration data of a first halftone screen and the correlation data, according to an embodiment.

FIG. 9 illustrates the producing of calibration data for two halftone screens from the calibration data of the first halftone screen and the correlation data. As explained in detail in FIG. 8 the old calibration data for the halftone screens HS1, HS2, HS3 are not needed.

From the new calibration data for the first halftone screen HS1 and the correlation data represented by the first-order correlation, the calibration data for second and third halftone screens HS2, HS3 are produced simultaneously. This procedure is used for printing images simultaneously and different screens are used for printing each of the images.

FIG. 10 is a graphical representation of the correlation data for two halftone screens for a distinct gray level expressed in a digital dot area DA and ink color cyan C.

The digital dot area DA is reproduced by the printed dot area PA with two different halftone screens HDI-175 and Sequin. The measured printed dot area PA for the halftone screen HDI-175 is shown on the horizontal axis and the printed dot area PA for the halftone screen Sequin is shown on the vertical axis. The printed areas are measured with a digital dot area of DA=20% as input.

The halftone screens HDI-175 with 175 lpi and Sequin has 145 lpi. The unit of measurement lpi expresses the halftone screen frequency, which is the number of lines per inch of the halftone pattern. The screen frequency is limited by the number of unique gray levels the printing system can represent and depends on the resolution of the printing system measured in dots per inch or dpi. The halftone screens HDI-275 and Sequin follow the technique of AM halftone screening, by modulating the size of the printed dots according to tone.

The measured printed dot areas PA are related to each other for different print conditions, including two different instances of the same printing system type printer1, printer2, two different types of substrates substrate1, substrate2 and time-drift of the printing systems printer1, printer2. Four printing system substrate combinations are shown. The time-drift changes for each of the combinations. Two instances of the same printing system type printer1, printer2, e.g. the liquid-toner electrographic printer HP-Indigo 5000 are used. Two different kinds of substrates substrate1, substrate2, including paper, and glossy paper are used.

For both halftone screens, HDI-175 and Sequin, the printed dot area shows a dot gain. The printed dot areas reach from 30% to 50% for the different printing systems printer1, printer2 and substrates substrate1, substrate2 and differ from the intended digital dot area of 20% because of the dot gain. The printed dot area PA is therefore darker than the digital dot area DA.

The first-order correlation is shown for a digital dot area of 20% and one ink color. The parameterization of the correlation data is performed by means of a linear equation. The gradient 'm' is the relative change of the printed areas PA for the halftone screens HDI-175 and Sequin. The axis intercept 't' is the actual difference between the halftone screens. The gradient m and the axis intercept 't' are the correlation parameters. The linear equation is:

($PA$ with Sequin)=$m$×($PA$ with $HDI$-175)+$t$.

In other embodiments a similar first-order correlation is generated for various gray levels or digital dot areas DA and for each ink color magenta, yellow and blue. The first-order correlations are also parameterized.

This parameterized correlation data represented by the first-order correlation are provided to a particular printing system, which is equipped with the two halftone screens HDI-175 and Sequin. A calibration measurement for the printing system is performed for the halftone screen HDI-175. By way of example it is assumed that a digital dot area DA of 20% is reproduced by a printed dot area PA of 53%. From correlation parameters of the first-order correlation it is obvious that the printed dot area PA for the halftone screen Sequin is 50%. Therefore the calibration data for the halftone screen Sequin are produced for the digital DA=20% on the particular printing system without resorting to previous calibration data for the halftone screen Sequin.

Other correlation data for different digital dot areas and ink colors are also provided to the particular printing system. The calibration data are therefore produced for different digital dot areas DA and the ink colors cyan, magenta, yellow and black.

Figure 11:
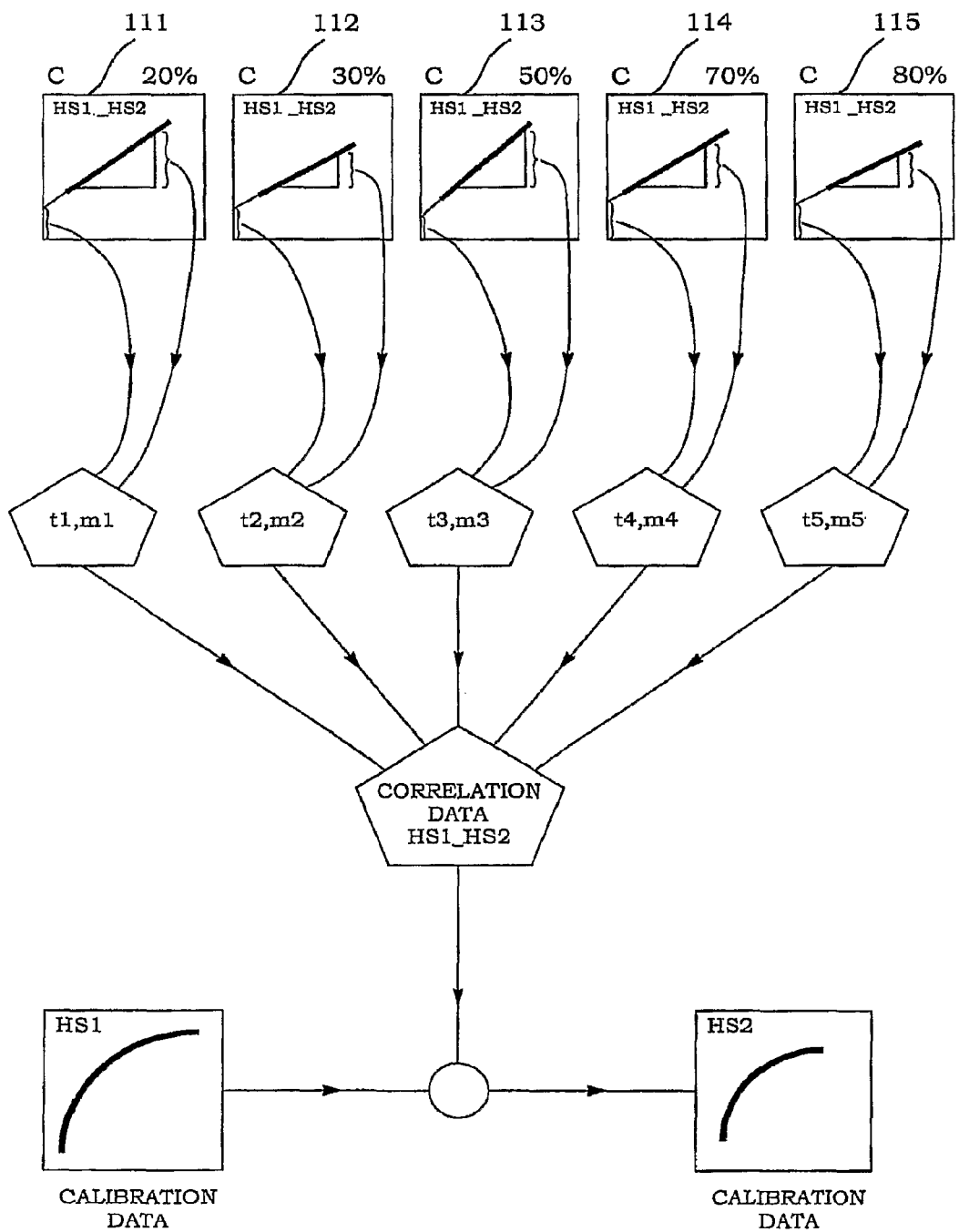
FIG. 11 illustrates the correlation data for two halftone screens for several gray levels and ink color cyan, according to an embodiment.

FIG. 11 illustrates the correlation data for two halftone screens HS1, HS2 for several gray levels expressed as digital dot areas DA arid for the ink color cyan C.

The correlation data represented by the first-order correlations are shown in blocks 111, 112, 113, 114, 115 for several digital dot areas DA of 20%, 30%, 50%, 70% and 80% respectively. The correlation parameters are the gradients m1, m2, m3, m4, m5 and the axis intercept are t1, t2, t3, t4, t5. From the correlation parameters the correlation data for the halftone screens HS1, HS2 are produced.

The calibration data for the second halftone screen HS2 are produced from the calibration data for the first halftone screen HS1 and the correlation data. The calibration data for the second halftone screen HS2 are produced for several digital dot areas and for the ink color cyan. In other embodiments the calibration data for the second halftone screen HS2 are produced for the ink colors cyan, magenta, yellow and black.

Figure 12:
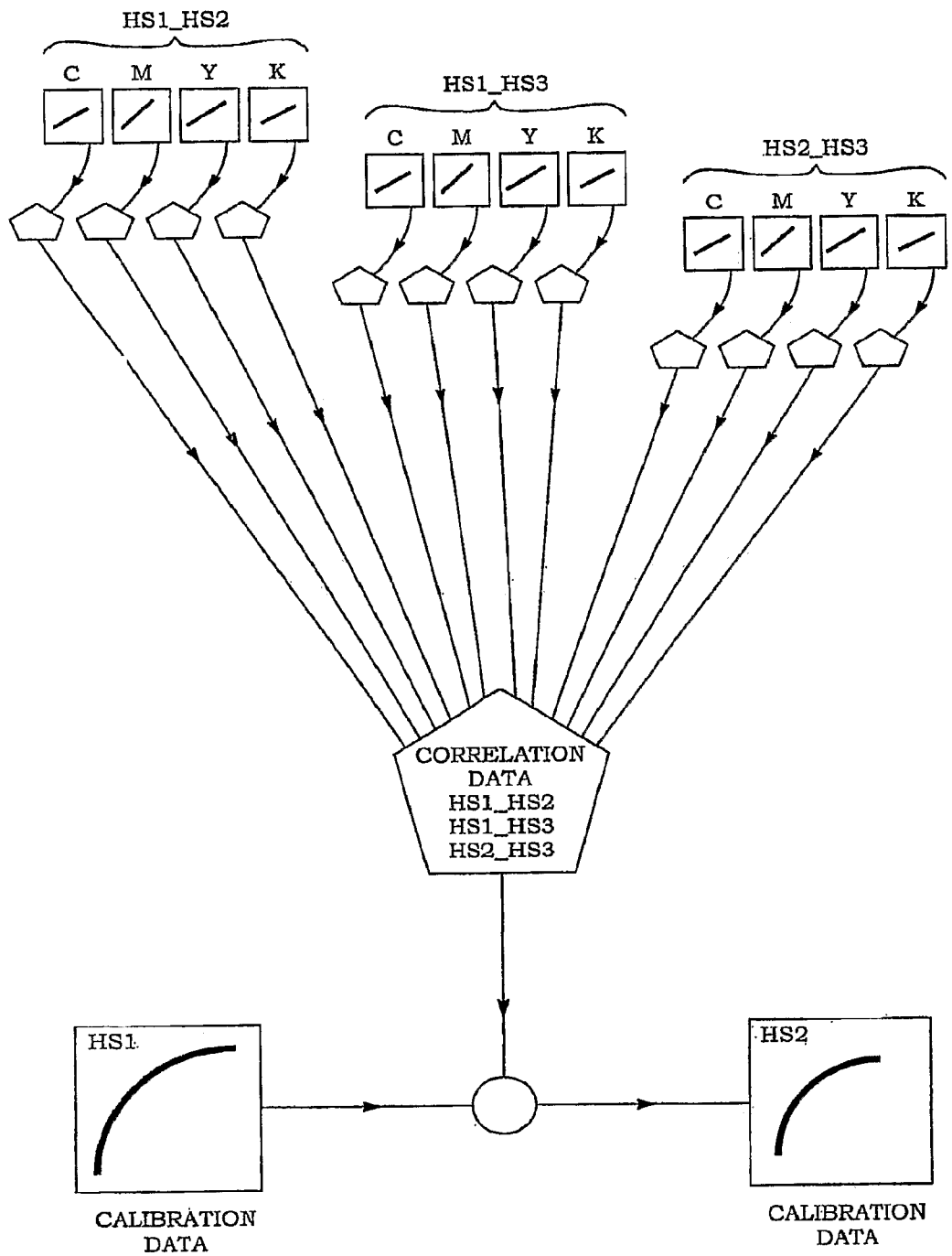
FIG. 12 illustrates the correlation data for the halftone screens and the ink colors, according to an embodiment.

FIG. 12 illustrates the correlation data for the halftone screens HS1, HS2, HS3 for the ink colors C, M, Y, K.

The correlation data are available for each ink color C, M, Y, K and for each combination of halftone screens HS1_HS2, HS1_HS3, HS2_HS3. The calibration data for the second halftone screen HS2 are produced for the ink colors C, M, Y, K, from the correlation data and from the calibration data for the first halftone screen HS1.

In other embodiments the calibration data are generated for the second halftone screen HS2. Then the calibration data for the third halftone screen HS3 or for the first halftone screen HS1 are produced from the correlation data and the calibration data for the second halftone screen HS2.

The preferred embodiments enable a determination of calibration data for the halftone screens of the printing system from a single calibration process performed for one of the halftone screens and the correlation data which represent a first order correlation between the halftone screens, without resorting to previous calibration data for the halftone screens.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method comprising:
receiving first calibration data for a first halftone screen particular to a particular printing device, the first halftone screen comprising a first pattern of printed dots of varying size and shape applied to a continuous-tone version of a digital image to generate a halftone version of the digital image suitable for printing;
correlating a second halftone screen with the first halftone screen to generate correlation data, the second halftone screen comprising a second pattern of printed dots of varying size and shape applied to the continuous-tone version of the digital image to generate the halftone version of the digital image suitable for printing; and
applying the correlation data to the first calibration data to generate second calibration data for the second halftone screen particular to the particular printing device without having to employ previous second calibration data for the second halftone screen particular to the particular printing device; calibrating the second halftone screen for the particular priming device, using the second calibration data;
applying the second halftone screen to the continuous-tone version of the digital image to generate the halftone version of the digital image; and
printing the halftone version of the digital image generated by applying the second halftone screen to the continuous-tone version of the digital image, using the particular printing device.

2. The method of claim 1, further comprising performing a calibration process for the particular printing device using the first halftone screen, wherein performance of the calibration process results in generation of the first calibration data,
such that the second calibration data for the second halftone screen particular to the particular printing device is generated without having to perform another calibration process for the particular printing device using the second halftone screen,
and such that the second calibration data for the second halftone screen is generated based on the first calibration data resulting from the performance of the calibration process using the first halftone screen.

3. The method of claim 1, wherein correlating the second halftone screen with the first halftone screen comprises performing a correlation between the second halftone screen and the first halftone screen that is a first-order correlation in that a calibration of the first halftone screen is mapped onto a calibration of the second halftone screen, as opposed to a second-order calibration in which a calibration change of the first halftone screen is mapped onto a calibration change of the second halftone screen.

4. The method of claim 1, wherein correlating the second halftone screen with the first halftone screen comprises:
producing first printed output from a digital input for different print conditions using the first halftone screen;
producing second printed output from the digital input for the different print conditions using the second halftone screen; and
relating the second printed output with the first printed output to generate the correlation data.

5. The method of claim 1, wherein the first calibration data for the first halftone screen comprises separate first calibration data for each of a plurality of different color inks of the particular printing device.

6. The method of claim 1, wherein the correlation data comprises separate correlation data for each of a plurality of different color inks.

7. The method of claim 1, wherein the second calibration data for the second halftone device comprises separate second calibration data for each of a plurality of different color inks of the particular printing device.

8. The method of claim 1, wherein the correlation data is independent of the particular printing device.

9. A method comprising:
performing a calibration process for a particular printing device using a first halftone screen, where performance of the calibration process results in generation of first calibration data for the first halftone screen particular to the printing device, the first halftone screen comprising a first pattern of printed dots of varying size and shape applied to a continuous-tone version of a digital image to generate a halftone version of the digital image suitable for printing;
correlating a second halftone screen with the first halftone screen to generate correlation data, the second halftone screen comprising a second pattern of printed dots of varying size and shape applied to the continuous-tone version of the digital image to generate the halftone version of the digital image suitable for printing, the correlation data independent of the particular printing device;
applying the correlation data to the first calibration data to generate second calibration data for the second halftone screen particular to the particular printing device without having to employ previous second calibration data for the second halftone screen particular to the particular printing device;
calibrating the second halftone screen for the particular printing device, using the second calibration data;
applying the second halftone screen to the continuous-tone version of the digital image to generate the halftone version of the digital image; and
printing the halftone version of the digital image generated by applying the second halftone screen to the continuous-tone version of the digital image, using the particular printing device,
wherein the second calibration data for the second halftone screen particular to the particular printing device is generated without having to perform another calibration process for the particular printing device using the second halftone screen,
and wherein the second calibration data for the second halftone screen is generated based on the first calibration data resulting from the performance of the calibration process using the first halftone screen.

10. The method of claim 9, wherein correlating the second halftone screen with the first halftone screen comprises performing a correlation between the second halftone screen and the first halftone screen that is a first-order correlation in that a calibration of the first halftone screen is mapped onto a calibration of the second halftone screen, as opposed to a second-order calibration in which a calibration change of the first halftone screen is mapped onto a calibration change of the second halftone screen.

11. The method of claim 9, wherein correlating the second halftone screen with the first halftone screen comprises:
producing first printed output from a digital input for different print conditions using the first halftone screen;
producing second printed output from the digital input for the different print conditions using the second halftone screen; and
relating the second printed output with the first printed output to generate the correlation data.

12. The method of claim 9, wherein the first calibration data for the first halftone screen comprises separate first calibration data for each of a plurality of different color inks of the particular printing device.

13. The method of claim 9, wherein the correlation data comprises separate correlation data for each of a plurality of different color inks.

14. The method of claim 9, wherein the second calibration data for the second halftone device comprises separate second calibration data for each of a plurality of different color inks of the particular printing device.

15. The method of claim 9, wherein the correlation data is independent of the particular printing device.

16. A printing system comprising:
a particular printing device to print a halftone version of a digital image;
a mechanism communicatively connected to the particular printing device to generate the halftone version of the digital image by:
receiving first calibration data for a first halftone screen particular to a particular printing device, the first halftone screen comprising a first pattern of printed dots of varying size and shape applied to a continuous-tone version of the digital image to generate the halftone version of the digital image suitable for printing;
receiving correlation data generated by correlating a second halftone screen with the first halftone screen, the second halftone screen comprising a second pattern of printed dots of varying size and shape applied to the continuous-tone version of the digital image to generate the halftone version of the digital image suitable for printing;
applying the correlation data to the first calibration data to generate second calibration data for the second halftone screen particular to the particular printing device without having to employ previous second calibration data for the second halftone screen particular to the particular printing device;
calibrating the second halftone screen for the particular printing device, using the second calibration data; and
applying the second halftone screen to the continuous-tone version of the digital image to generate the halftone version of the digital image.

17. The printing system of claim 16, wherein the mechanism is to further perform a calibration process for the particular printing device using the first halftone screen, wherein performance of the calibration process results in generation of the first calibration data,
such that the second calibration data for the second halftone screen particular to the particular printing device is generated without having to perform another calibration process for the particular printing device using the second halftone screen,
and such that the second calibration data for the second halftone screen is generated based on the first calibration data resulting from the performance of the calibration process using the first halftone screen.

18. The printing system of claim 16, wherein the correlation data is independent of the particular printing device.

* * * * *

UNITED STATES PATENT AND TRADEMARK OFFICE
CERTIFICATE OF CORRECTION

| | |
|---|---|
| PATENT NO. | : 8,339,690 B2 |
| APPLICATION NO. | : 12/594135 |
| DATED | : December 25, 2012 |
| INVENTOR(S) | : Yohanan Sivan et al. |

It is certified that error appears in the above-identified patent and that said Letters Patent is hereby corrected as shown below:

In column 12, line 28, in Claim 1, delete "priming" and insert -- printing --, therefor.

In column 13, line 49, in Claim 9, delete "forthe" and insert -- for the --, therefor.

Signed and Sealed this
Twenty-sixth Day of March, 2013

Teresa Stanek Rea
*Acting Director of the United States Patent and Trademark Office*